July 25, 1967 K. F. WALLACE 3,333,254
ELECTRON BEAM READOUT SYSTEM WITH BEAM CONTROL CIRCUIT
Filed Oct. 19, 1962
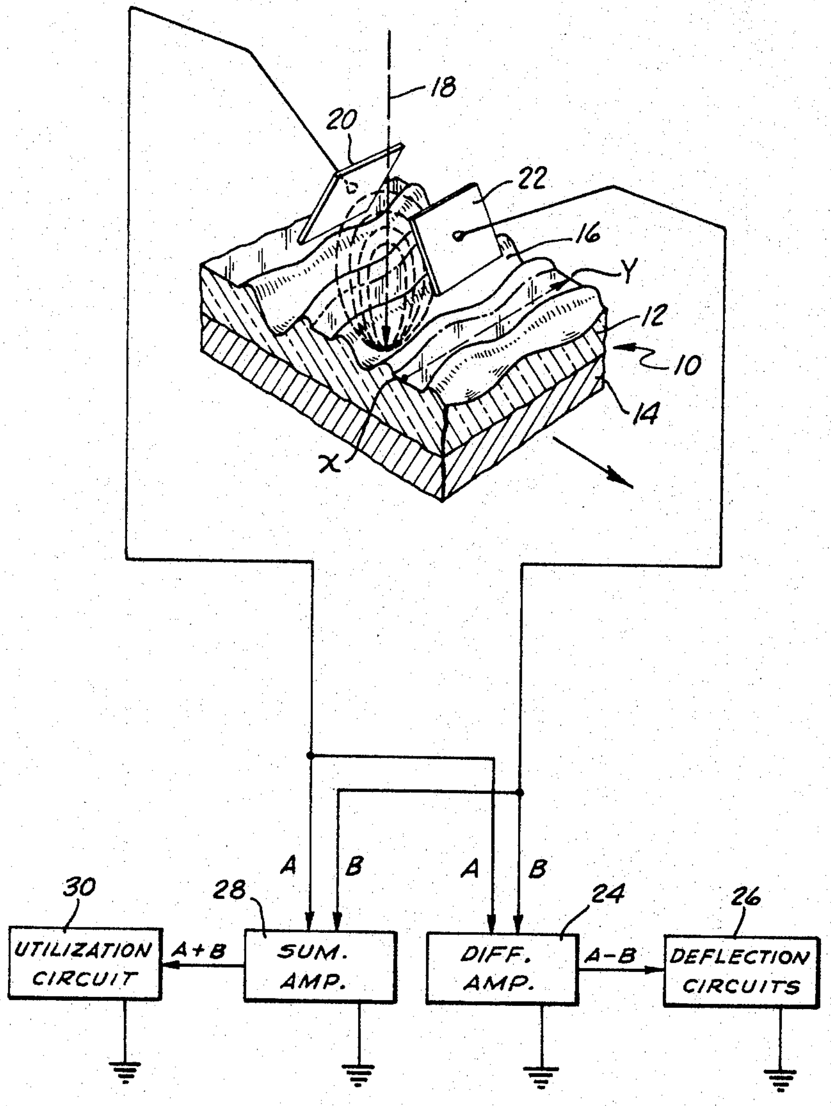
KURT F. WALLACE
INVENTOR.
BY Nathan N. Kallman
ATTORNEY United States Patent Office 3,333,254
Patented July 25, 1967

3,333,254

ELECTRON BEAM READOUT SYSTEM WITH BEAM CONTROL CIRCUIT

Kurt F. Wallace, Redwood City, Calif., assignor to Ampex Corporation, Redwood City, Calif., a corporation of California Filed Oct. 19, 1962, Ser. No. 231,636
3 Claims. (Cl. 340—173)

This invention relates to an improved electron beam readout system, and in particular to a readout system that affords accurate tracking of recorded information by a scanning electron beam.

It is highly preferable to employ an electron beam for reading out recorded information. High scanning speeds are possible with an electron beam, and therefore very high frequency signals may be read out thereby. Also, an electron beam with a controlled beam spot size can be utilized to scan very minute information areas or bits of a recorded medium that affords a high packing density.

In the data storage field, one major goal is to provide a system that is capable of processing wide bandwith signal so that information signals in the ultra high frequency range may be recorded and reproduced. Another major goal is to achieve high density recording and playback whereby a large amount of information may be processed while employing a minimum of storage space. In addition to these features, it is desirable to have good playback signal resolution as well as an efficiently operating system.

A known high density recording system that is adaptable to electron beam readout employs a thermoplastic medium, such as described in the U.S. Patent No. 3,168,726 to E. V. Boblett entitled, "Apparatus for Thermoplastic Readout," and assigned to the assignee of the present application. Thermoplastic recording may be achieved by directing a modulated electron beam at a thermoplastic film whereby electrons are deposited on the surface of the film in accordance with the modulation or information that is to be recorded. By heating the film, the film surface is deformed and, upon cooling, the resultant undulations or grooves represent a stored record of the information. However, during readout of the thermoplastic by an electron scanning beam, it is essential that each line of information be tracked accurately by the scanning beam so as to provide a maximum output of the recorded signal with a good signal-to-noise ratio and a minimum of distortion.

In known prior art systems, separate detection components and circuits are utilized to read out the information signal, and to develop tracking information for controlling the path or deflection of the electron beam. When operating with storage media, such as thermoplastic films, that have high packing density and are generally of small area, it is desirable to utilize a minimum of system components and circuits in association with such small area storage media.

An object of this invention is to provide an improved readout system that utilizes an electron beam for scanning a thermoplastic film having recorded information.

Another object of this invention is to provide an improved means for tracking recorded lines of information with a scanning electron beam.

Another object is to provide a means for deriving an output signal from a recorded thermoplastic film and for employing the same means to provide accurate tracking of the recorded information.

According to this invention, a readout system for thermoplastic films comprises a pair of collectors that sense the magnitude or intensity of the signal output derived from the recorded thermoplastic. An electron readout beam repeatedly scans the same path, which is substantially transverse of the longitudinal path of motion of the thermoplastic medium, and substantially coincident in length and direction to the transverse recorded grooves or tracks of information. The collectors are located so that at all times each collector is spaced the same distance from any point along the predetermined scanning path. Each collector receives signal energy representing the information stored on the medium, in response to the impingement of the electrons of the beam on such medium.

Whenever the beam is not accurately centered on the recorded track being scanned, the collectors sense signals of different magnitude. These sensed signals are directed to a difference amplifier to develop a difference or error signal. The error signal is applied to the beam deflection circuits, which act to deflect the beam towards the center of the track. Simultaneously, the signals received by the collectors are added to provide a readout data signal representative of the information recorded on the thermoplastic storage medium.

The invention will be described in greater detail with reference to the accompanying drawing, in which the sole figure is a diagram of the inventive system, showing a perspective view of a segment of a thermoplastic storage medium with an associated circuit in block form.

In the figure of the drawing, an embodiment of the invention incorporates a thermoplastic medium 10 comprising a thermoplastic film 12 and a supporting base 14, which may be Mylar. Signal information is recorded on the thermoplastic film 12 in the form of undulations or grooves 16 that vary in depth in accordance with the information registered on the film. The grooves 16 are closely spaced and are disposed substantially parallel to each other across the medium 10.

During the readout mode, a scanning electron beam 18, that is generated in a well known manner within an evacuated envelope (not shown) scans the grooves 16 of recorded information successively. The thermoplastic medium 10 is transported through the evacuated envelope at a substantially constant speed by known drive means, not shown in the drawing since such means are not necessary for the explanation of the invention.

The electron beam 18 scans the same path *x–y* repetitively across the medium 10 in a direction substantially perpendicular to the axis of the path of motion of the moving medium. When the beam 14 reaches the end of the path at point *y*, the beam is deflected from point *y* back to point *x* at the beginning of the scanning path. During this deflection period, the beam 18 is blanked out so that no output signal is developed.

The electron beam 18 operates above the second crossover potential of the secondary emission curve, at about seven kilovolts, while scanning the thermoplastic film 12. Upon impingement of the relatively high velocity electron beam 18 on the thermoplastic film 12, secondary electrons are emitted from the undulated or grooved surface of the recorded film 12. The secondary electrons define a cosine type distribution pattern, and the number of electrons that are detected is representative of the depth of the elemental area of the groove being tracked at any given instant. To detect the secondary electron emission that corresponds with each elemental area being scanned in sequence, and which varies as the readout beam 18 progresses along a line of recorded information, a pair of electrodes or collectors 20 and 22 are disposed close to the thermoplastic film 12, and are equally spaced from each point along the predetermined scan path *x–y* of the beam 18.

The speed of the moving medium 10 and the rate of beam deflection are correlated so that the beam appears at point *x* substantially simultaneously with the appearance of the succeeding track of information at the path defined by points $x$–$y$. However, as a result of variations in speed of the medium 10, or nonuniform spacing of the recorded tracks 16, or other undesirable variations in the dimensions of the medium, the beam 18 may not be precisely centered on the track being scanned. Therefore, it is necessary to compensate for any offset or incongruity between the beam 18 and the scanned track 16.

The pair of spaced collectors 20 and 22 is utilized to detect the secondary electron emission that results from the application of the readout beam 18 across the medium 10. If the beam 18 is not accurately centered on the track 16, the secondary electrons will not be uniformly distributed with relation to the collectors 20 and 22, and therefore each collector will receive a different number of electrons when the beam is off center.

If we designate the signal received by collector 20 as signal A, and that received by collector 22 as signal B, then the signal output that may be detected is $A+B$; whereas the tracking output is $A-B$. In accordance with this invention, signals A and B are passed from the collectors 20 and 22 to a difference amplifier 24 that generates a difference signal $(A-B)$, whenever the beam 18 is not accurately tracking the groove 16, that represents the difference in magnitude of the signals received at each collector 20 and 22. The difference signal or error signal is applied to deflection circuits 26 that act to correct the position of the electron beam 18, in a well known manner. The beam 18 is thus moved laterally relative to the path $x$–$y$ and is centered on the track 16 being scanned, following the track closely as it progresses across the medium 10. In this manner, maximum signal output is achieved and an improved signal-to-noise ratio is realized.

Furthermore, to retrieve the signal information for playback, signal A received by the collector 20 is added to signal B received by the collector 22 in a summing amplifier 28. The added signal $(A+B)$ representing the signal output from the medium 10, which in turn is indicative of the recorded signal, is then fed to a utilization circuit 30 for display or electrical readout by way of example.

In a successful application of this invention, a thermoplastic medium having recorded tracks of about .001 inch diameter was read out by a seven kilovolts electron beam having a spot diameter approximate to but less than the diameter of the tracks. The thermoplastic was transported at about five inches per second during the readout process, and the signal-to-noise ratio was greatly enhanced.

What is claimed is:

1. A system for reading out information from a recorded thermoplastic film comprising:

means for directing an electron readout beam repeatedly along a path for scanning the recorded grooves of such film and for generating secondary electrons in an amount representative of the information signal on the recorded groove being scanned;

a pair of collectors, each collector being equally spaced from and on opposite sides of the path defined by the beam for collecting the secondary electrons generated and for developing electrical signals related to the collected electrons;

a summing amplifier connected to the pair of electrodes for adding the signals from each collector to provide an output signal representative of the recorded information;

a difference amplifier connected to the pair of electrodes in electrical parallel with the summing amplifier for deriving a difference signal representing the difference between the signals developed by the same collectors; and means for employing such difference signal to deflect the electron beam so that the beam substantially follows the center of the recorded groove being scanned.

2. A system for reading out information from a recorded thermoplastic film comprising:

means for directing an electron readout beam repeatedly along a path for scanning the recorded grooves of such film and for generating secondary electrons in an amount representative of the information signal on the recorded groove being scanned;

a pair of collectors, each collector being equally spaced from the path defined by the beam for collecting the secondary electrons generated and for developing electrical signals related to the collected electrons;

means for adding the signals from each collector to provide an output signal representative of the recorded information;

means for deriving a difference signal representing the difference between the signals developed by the same pair of collectors; and means for employing such difference signal to deflect the electron beam so that the beam substantially follows the center of the recorded groove being scanned.

3. A system for reading out information from a recorded thermoplastic film comprising:

means for directing an electron readout beam repeatedly along a path for scanning the recorded grooves of such film and for generating secondary electrons in an amount representative of the information signal on the recorded groove being scanned;

a single pair of collectors, each collector being equally spaced from and on opposite sides of the path defined by the beam for collecting the secondary electrons generated and for developing electrical signals related to the collected electrons and representing the stored information;

a difference amplifier for deriving a difference signal representing the difference between the signals developed by the same collectors; and means connected to said difference amplifier for employing such difference signal to deflect the electron beam so that the beam substantially follows the center of the recorded groove being scanned.

References Cited

UNITED STATES PATENTS

| | | | |
|---|---|---|---|
| 2,657,378 | 10/1953 | Gray | 340—173 |
| 3,168,726 | 2/1965 | Boblett | 340—173 |
| 3,247,493 | 4/1966 | Wolfe | 340—173 |

BERNARD KONICK, *Primary Examiner.*

T. W. FEARS, *Assistant Examiner.*